United States Patent Office 3,297,404
Patented Jan. 10, 1967

3,297,404
PURIFICATION OF HYDROGEN PEROXIDE
Ralph B. Elliott, Penn Yan, and James H. Young, Niagara Falls, N.Y., assignors to E. I. du Pont de Nemours and Company, Wilmington, Del., a corporation of Delaware
No Drawing. Filed July 8, 1957, Ser. No. 670,621
5 Claims. (Cl. 23—207)

This invention relates to the purification of hydrogen peroxide and more particularly to a method for removing anion impurities therefrom.

Although the usual commercial grades of hydrogen peroxide are relatively pure, they generally contain various anion impurities in significant concentrations. Such impurities include phosphates, nitrates, chlorides and sulfates.

For some purposes the presence of appreciable concentrations of one or all of the above anion impurities, is undesirable. Also, chloride ions are generally objectionable since they accelerate corrosion and pitting of aluminum even at a concentration as low as 1 p.p.m. As uses for hydrogen peroxide have expanded, particularly in the newer applications, the need for higher purity product has also increased and high purity product has become highly desirable if not essential for certain important applications.

It is an object of the invention to provide an efficient and practical method of purifying hydrogen peroxide. A particular object is to provide a method whereby anion impurities may be readily removed or reduced to low concentration levels of the order of 1 to 5 mg./l. or less. Another object is to provide an improved ion-exchange method of purifying hydrogen peroxide. Still further objects will be apparent from the following description.

Distillation methods are not entirely satisfactory for removing impurities even though they be nonvolatile, particularly at low concentrations. This is because it is difficult to prevent carry over of the impurities during distillation by entrainment in the vapors. Successful removal of heavy metal impurities has been achieved by the method of Young U.S. Patent 2,676,923 involving a treatment with a nuclear sulfonated aromatic hydrocarbon cation-exchange resin but so far as we are aware no satisfactory ion-exchange treatment has heretofore been known for removing anion impurities. It has been previously proposed to employ for this purpose anion-exchange resins based on condensates of phenol and formaldehyde (P.B.–33492; Analytical Chem. vol. 21, pages 87–96 (1949)). However, use of such resins is impractical and dangerous, particularly in treating hydrogen peroxide of considerable strength. Such resins react with hydrogen peroxide at ordinary temperatures and impart color and organic contaminants to the peroxide. Because the heat of reaction is high, a dangerous explosive type reaction or decomposition is possible unless treatment is effected under drastically reduced temperatures, e.g., below 0° C. Furthermore, the peroxide tends to break down the resin with formation of gels after short contact.

The objects of the invention are accomplished by intimately contacting nonalkaline hydrogen peroxide (i.e., having a pH not greater than 7) containing undesirable anion impurities with a particular type of anion-exchange resin in a particular salt form. The resins found to be suitable are those of the strongly basic type having functional quaternary ammonium groups whose basic nitrogen atoms are attached through saturated aliphatic hydrocarbon groups to the aromatic nuclei of a cross-linked polymer of a vinyl aromatic hydrocarbon. However, to be useful for the present purposes, such resins must be employed in the form of a salt of an acid whose dissociation constant is at least $3 \times 10^{-7}$ (first H) and whose anion is compatible with hydrogen peroxide.

The invention is illustrated by the following examples in which all parts are parts by weight, and all percentages (concentrations) are percentages by weight.

Example 1.—The anion-exchange resin used was of the type described in McBurney U.S. Patent 2,591,573 in which the nitrogen atoms of the functional quaternary ammonium groups are attached through saturated aliphatic hydrocarbon groups to the aromatic nuclei of a cross-linked copolymer of styrene and divinyl benzene. This resin, sold by the Rohm and Haas Company under the designation "Amberlite" IRA–400, may be made by quaternizing a chloromethylated copolymer of styrene and divinyl benzene with trimethylamine to produce the trimethylbenzyl ammonium resin. It was obtained as the chloride salt and was first treated with a 4% sulfuric acid solution to remove heavy metal impurities and to convert the resin from the chloride salt to the sulfate salt. This was done by passing the acid through a column of the resin until the effluent was free of chloride ion, then washing with water until the effluent was free of sulfate ion. The resin was then converted to its bicarbonate salt by passing a 4% sodium bicarbonate solution through the column until the effluent was free of sulfate ion, then washing with distilled water until the effluent was free of bicarbonate ion, at which point the pH of the effluent remained constant at about pH 6.1.

An aqueous 35% hydrogen peroxide solution containing anion impurities was then flowed through the resin column at room temperature with the following results:

| Peroxide Solution | pH | Anion Concentrations, mg./l. | | |
|---|---|---|---|---|
| | | Sulfate | Phosphate | Nitrate |
| Before Treatment | 2.1–2.5 | 300 | 8.8 | 11.5 |
| After Treatment | 2.6–3.5 | <2 | <0.2 | <0.4 |

There was no evidence of reaction between the resin and hydrogen peroxide and no loss of the latter through decomposition.

Example 2.—A cation-exchange resin which was a nuclear sulfonated copolymer of styrene and divinyl benzene, sold by the Dow Chemical Company under the designation "Dowex" 50, was condition to remove heavy metal impurities by treatment with dilute sulfuric acid solution as described in Example 1 of Young U.S. Patent 2,676,923. An anion-exchange resin, "Amberlite" IRA–400, was converted to its bicarbonate salt as described in Example 1. The two resins were then mixed in equal parts and the mixture was placed in a column.

Aqueous 35% hydrogen peroxide having a pH of 2.9 and containing 11.5 mg./l. of nitrate ion and 8.8 mg./l. of phosphate ion was passed through the column at a rate of 5 gal./cu. ft. of resin/min. at about 25° C. No decomposition of peroxide or reaction with the resin resulted. The effluent peroxide solution had a pH of 3.2 and was found to contain <0.2 mg./l. of phosphate ion and <0.2 mg./l. of nitrate ion.

Example 3.— A 4% solution of phosphoric acid was passed through a column of "Amberlite" IRA–400 anion-exchange resin (chloride salt) until the column effluent was free of chloride ion. Distilled water was then passed through the column until the effluent was free of phosphate ion, at which time the resin was in the form of its phosphate salt. The resin was then mixed with an equal part of "Dowex" 50 cation-exchange resin which had been conditioned as described in Example 2, and the mixture was placed in a column.

Aqueous 35% hydrogen peroxide having a pH of 2.5 and containing 11.5 mg./l. of nitrate ion was passed through the column at a rate of 5 gal./cu. ft. of resin/min. at room temperature. The effluent peroxide solution had a pH of 3.5 and contained only 0.35 mg./l. nitrate ion.

*Example 4.*—A 5% sodium carbonate solution was passed through a column of "Amberlite" IRA-400 resin (chloride salt) until the column effluent was free of chloride ion. Distilled water was then passed through the column until the pH of the effluent remained constant and the water was drained from the column. At this point, the wet resin was in the carbonate salt form.

In a preliminary test, it was found that when 3 to 5 grams of the above wet resin was submerged at 25 to 30° C. in about 10 grams of 90% hydrogen peroxide for 6 to 24 hours, no decomposition of the peroxide occurred, showing that the resin was essentially free of catalytic impurities.

A portion (3 parts) of the wet resin was added to 230 parts of a first lot of 90% hydrogen peroxide solution under agitation at 10 to 15° C. in a treating vessel. There was added to the agitated mixture a further 19,770 parts of the hydrogen peroxide over a period of about 6 hours while continuously removing hydrogen peroxide at the same rate from the bottom through a screen filter and a U-tube designed to maintain a constant level of liquid in the treating vessel. Average residence time of the peroxide solution in the treating vessel was about 3.5 minutes. A second lot (30,000 parts) of the same 90% hydrogen peroxide was similarly treated with another 6 parts of the above wet resin. In neither instance was there evidence of peroxide decomposition or reaction with the resin. Results of the two treatments were as follows:

|  | Original Solution | Treated 90% $H_2O_2$ | |
|---|---|---|---|
|  |  | 1st Lot | 2nd Lot |
| pH | 0.9 | 1.5 | 1.5 |
| Sulfate ion, mg./l | 5.1 | 1.0 | 0.8 |
| Nitrate ion, mg./l | 3.3 | 1.4 | 0.3 |
| Phosphate ion, mg./l | 0.35 | 0.1 | 0.1 |
| Chloride ion, mg./l | 0.5 | 0.15 | 0.1 |
| Stability, percent active oxygen lost at 100° C. in 24 hours | 1.0 | 0.77 | 0.43 |

*Example 5.*—The chloride salt of "Amberlite" IRA-410 anion-exchange resin was converted to the carbonate salt by treatment with sodium carbonate solution as described in Example 4. This resin, sold by Rohm and Haas Company, is another quaternary ammonium anion-exchange resin of the type described in McBurney U.S. Patent 2,591,573, obtained by quaternizing a chloromethylated copolymer of styrene and divinyl benzene with dimethylethanolamine to produce the dimethyl hydroxyethyl benzyl ammonium resin. By means of the preliminary test described in Example 4, the wet carbonate salt of the resin was found to be essentially free of impurities which catalyze peroxide decomposition. The wet resin (14 parts) was then added gradually to a stirred body of 1400 parts of 91% aqueous hydrogen peroxide at 20 to 25° C. The mixture was stirred 10 minutes and the resin then separated. No decomposition of peroxide resulted. Results were as shown below:

|  | 91% $H_2O_2$ | |
|---|---|---|
|  | Untreated | Treated |
| pH | −0.2 | 1.3 |
| Phosphate ion, mg./l | 0.45 | 0.22 |
| Sulfate ion, mg./l | 3.5 | 0 |
| Stability, percent active oxygen lost at 100° C. in 24 hours | 6.1 | 0.95 |

*Example 6.*—To one portion of an aqueous 90% hydrogen peroxide solution there was added gradually with stirring at room temperature an amount of the carbonate salt of "Amberlite" IRA-400 anion-exchange resin equal to 1% of the weight of the solution. The slurry was stirred 10 minutes and the resin separated by filtration. A second portion of the hydrogen peroxide solution was similarly treated except that along with the anion-exchange resin there was also added an equal amount of "Dowex" 50 cation-exchange resin in its acid form. Results of the treatments are as follows:

|  | Original Solution | Solution Treated With— | |
|---|---|---|---|
|  |  | Anion-Exchange Resin Only | Both Resins |
| pH | 0.9 | 1.6 | 1.5 |
| Sulfate ion, mg./l | 5.1 | 1.1 | 0.7 |
| Residue on evaporation at 100° C., mg./l | 18.6 | 14.7 | 2.2 |
| Residue on ignition, mg./l |  | 10.7 | 2.0 |

The above example shows the effectiveness of the carbonate salt of the anion-exchange resin in removing sulfate ions, whether the resin be used alone or with a cation-exchange resin. They also show the effectiveness of using the two resins together in removing nonvolatile impurities. Similar removal of nonvolatile impurities can be achieved by employing the two resins in sequence.

*Example 7.*—The chloride salt of "Dowex" 1, a quaternary ammonium anion-exchange resin, was converted to the sulfate salt by treatment with an excess of 5% sulfuric acid solution and then washed with a large excess of water. This resin was of the type obtained by quaternizing a chloromethylated copolymer of styrene and divinyl benzene with trimethylamine to produce the trimethylbenzyl ammonium resin. Six parts of the sulfate salt of the resin were stirred with 226 parts of 35% aqueous hydrogen peroxide at room temperature for 15 minutes and the resin was then filtered off. The original peroxide solution had a pH of 4.5 and contained 8 mg./l. of pyrophosphate ion and 10 mg./l. of chloride ion. The treated solution had a pH of 3.4 and contained 0.03 mg./l. pyrophosphate ion and <5 mg./l. chloride ion.

*Example 8.*—The chloride salt of "Dowex" 2, a quaternary ammonium anion-exchange resin, was converted to the nitrate salt by treatment with an excess of 5% nitric acid and then washed with a large excess of water. This resin was of the type obtained by quaternizing a chloromethylated copolymer of styrene and divinyl benzene with dimethylethanolamine to produce the dimethyl hydroxyethyl benzyl ammonium resin. Six parts of the nitrate salt of the resin were stirred with 226 parts of 35% aqueous hydrogen peroxide at room temperature for 15 minutes and the resin was then filtered off. The original peroxide solution had a pH of 4.8 and contained 8 mg./l. pyrophosphate ion and 10 mg./l. sulfate ion. The treated solution had a pH of 3.4 and contained 0.03 mg./l. pyrophosphate ion and 1.4 mg./l. sulfate ion.

Treatment of hydrogen peroxide with the resin can be readily and successfully carried out at room temperature, the preferred temperatures ranging from about 10 to 30° C. Lower temperatures down to the freezing point of the hydrogen peroxide solution can be used but are not necessary. Higher temperatures can also be used but the maximum temperature permissible in any given instance will depend chiefly upon the strength of the peroxide solution to be treated. Thus 90% hydrogen peroxide tends to react with the resin at temperatures in the 50 to 60° C. range and 35% hydrogen peroxide tends to react with the resin when the temperature reaches about 75° C. Since reaction, once started, can develop a dangerous condition, temperatures above about 40° C. are generally best avoided, particularly since their use offers no advantage. Should it be desired to use a temperature approaching that at which reaction between the resin and peroxide may result, provision should be made for rapidly diluting the peroxide-resin mixture with large amounts of cold water should there be any indication of a rapid temperature increase in the system. Also, it is generally advisable as a precautionary measure to wash used resin with water before discarding or regenerating the resin for reuse, since long contact of resin with concentrated peroxide presents a safety hazard, particularly if considerable contamination with materials which catalyze peroxide decomposition has occurred.

The treatment with the resin should be effected under fluid flow conditions, particularly when the peroxide solution being treated is of a strength greater than about 10%. By "fluid flow conditions" is meant conditions under which flow or movement of the peroxide solution with respect to the resin surfaces is continuously maintained and static contact between the resin and the solution is avoided. Fluid flow conditions can be readily realized by mixing and stirring the resin with the peroxide or by passing the latter through a bed of the resin. The treatment can be carried out batchwise or continuously. When the resin is slurried and stirred with the peroxide, beneficial results are obtained using as little as 0.01 part resin per 100 parts of hydrogen peroxide solution. Preferred proportions are about 0.1 to 10, e.g. 0.1 to 5 and most preferably 1 to 5, parts of resin per 100 parts of solution. Higher proportions can be used, as would be the case when the solution is passed through a column of the resin. The amount of resin required will depend upon the amounts of impurities to be removed and if solutions containing more than about 300 p.p.m. of undesired anion impurities are to be treated larger amounts of resin may be required, in which case incremental use of the resin in multiple treatments may be desirable. The slurry method is preferred when treating solutions containing hydrogen peroxide at concentrations greater than about 50%, e.g. 60 to upwards of 95%, as is also use of the carbonate form of the anion-exchange resin. When using the column method, e.g. to treat solutions of less than 60% strength, the bicarbonate form of the resin is preferred.

When using the slurry method, the solution and the resin can be continuously or intermittently added in predetermined proportions to treatment slurry under suitable agitation, while treated solution and used resin are separately removed either continuously or intermittently from the treatment slurry, the over-all operations being carried out so as to provide the desired contact time between the resin and the solution. Contact times of from about 1 to 15 minutes are usually sufficient, but longer times may be used. Times of 3 to 10 minutes are preferred. In column operations solution feed rates of from 5 to 50 gals. per minute per cu. ft. of particulate resin in the column have given good results.

The anion-exchange resin whose salts are suitable for the present purpose are those having functional quaternary ammonium groups whose basic nitrogen atoms are attached through saturated aliphatic hydrocarbon groups (preferably an acyclic group of 1 to 4 carbons) to the aromatic nuclei of a cross-linked polymer of a vinyl aromatic hydrocarbon, preferably a copolymer of a monovinyl aromatic hydrocarbon (e.g. the styrenes, ethyl vinyl benzenes and vinyl naphthalene) and a polyvinyl aromatic hydrocarbon (e.g. divinyl benzene, the divinyl toluenes and the divinyl naphthalenes). Such resins can be prepared as described in McBurney U.S. Patent 2,591,573 by haloalkylating a copolymer of a monovinyl and a divinyl aromatic hydrocarbon, e.g., styrene and divinyl benzene, and reacting the haloalkylated (preferably chloromethylated) product with a tertiary amine such as the trimethyl-, triethyl- and tripropylamines; dimethylethylamine, diethylcyclohexylamine and tricyclohexylamine; triphenylamine, diphenylethylamine, benzyldimethylamine and benzylphenylmethylamine. The hydrocarbon substituent groups of the amine employed to produce the quaternary ammonium anion-exchange resin should be free of aliphatic unsaturation and generally will be unsubstituted hydrocarbon groups, although hydrocarbon groups containing substituent groups (e.g., hydroxyl groups on an alkyl radical as in the hydroxyethyl group) which are compatible with hydrogen peroxide can also be used.

The basic or hydroxyl form of the above quaternary ammonium anion-exchange resins is unsuitable for the present purpose. It has been found that for satisfactory use the resin must be employed in the form of a salt of an acid whose dissociation constant (measured at about 25° C.) is at least $3 \times 10^{-7}$ for the first hydrogen (first H) and whose anion is compatible with hydrogen peroxide. The resin salts of strong acids such as sulfuric, phosphoric, pyrophosphoric, and nitric acids can be employed successfully to remove anion impurities of other acids, e.g. the resin nitrate salt to remove anions other than nitrate ion or the resin phosphate salt to remove anions other than phosphate ions. The resin chloride salt can similarly be used, but since anion removal is effected by exchange of the anion of the resin salt for other anions, resin chloride salts seldom will be employed because the presence of chloride ions is usually objectionable.

The preferred resin salts are the resin carbonates and bicarbonates since they will remove anion impurities generally and leave in exchange carbonate or bicarbonate ions which form water and carbon dioxide in acidic peroxide solutions.

Conversion of the anion-exchange resin to the desired salt form can be readily affected by treating, e.g., in a column, the hydroxyl or other salt form of the resin with an excess of a solution of the acid whose resin salt is desired, or a solution of a salt of such acid. Thus, if the resin phosphate salt is desired, the resin, e.g., as the usual chloride salt, can be treated with an excess of a solution of phosphoric acid or a water-soluble phosphate, e.g., tri-, di- or monosodium phosphate; or if the carbonate or bicarbonate resin salt is desired, the treating solution can be that of a water-soluble carbonate or bicarbonate, respectively, such as sodium carbonate or sodium bicarbonate. The term "resin in the form of a salt of an acid" is used herein and in the appended claims to mean the resin in the form obtained when it is treated with an excess of such acid or salt as indicated above. If the resin is not initially free of heavy metal impurities which catalyze the decomposition of hydrogen peroxide, such impurities can readily be removed by treating the resin with a solution of a strong acid such as sulfuric, nitric or phosphoric acid, before converting the resin to the desired salt form. However, the treatment to convert to the desired salt form often is effective to remove such impurities as well.

After the desired anion-exchange capacity of the resin salt has been exhausted, the resin can be discarded or, if desired, it can be regenerated for reuse by treating the exhausted resin with an excess of a solution of an acid whose resin salt is to be used, or a solution of a salt of such acid. If the resin is to be employed as the salt of a strong acid such as sulfuric, nitric, or phosphoric acid, in admixture with a cation-exchange resin, e.g., the acid form of a sulfonated styrene-divinyl benzene copolymer, so as to remove simultaneously anion and cation impurities, including heavy metal impurities, the exhausted mixture of both resins can be regenerated by treatment with a solution of the strong acid corresponding to the anion-exchange salt used. Alternatively, the resins of the mixture can be separated hydraulically (due to their differences in specific gravities) and the separated resins separately regenerated and then remixed for reuse.

When using such a mixture of resins, the cation-exchange resin can be the acid form of any sulfonated cross-linked polymer of vinyl aromatic hydrocarbon, e.g., the copolymer of a monovinyl aromatic hydrocarbon and a polyvinyl aromatic hydrocarbon, which has been preconditioned to remove heavy metal impurities as described in Young U.S. Patent 2,676,923. The resin is preferably a sulfonated copolymer of styrene and divinyl benzene.

The invention can be practiced to purify hydrogen peroxide in dilute or concentrated forms, e.g., aqueous solutions from around 3% strength to upwards of 95% strength. Since purification will most generally be effected as part of manufacturing operations, it will find greatest use in purifying hydrogen peroxide solutions of at least 15% (e.g., 25 to 90%) strength, since products of such strengths are produced by most commercial manufacturing methods.

The hydrogen peroxide to be treated with the anion-exchange resin salt should be acidic i.e. have a pH not exceeding 7; preferably, it will have a pH not more than 2 pH units above the pH representing the equivalence point of the hydrogen peroxide solution (see Elston U.S. Patent 2,497,814). It is also preferred that the pH of the hydrogen peroxide solution to be treated be not more than 3 pH units below the pH representing the equivalence point of the solution. Most preferably, the pH will be not more than 1.5 pH units above and not more than 3 pH units below the pH representing the equivalence point. The treatment with the resin salt usually will cause a slight increase in the pH of the solution when the resin is used in the form of the carbonate or bicarbonate salt. The resin purification treatment can be followed by an adjustment of the pH if desired by the addition of a base or an acid as required, employing, of course, an adjusting agent which will not introduce ions whose presence will be undesirable for the intended use of the hydrogen peroxide.

The invention provides a practical and efficient method for removing anion impurities from hydrogen peroxide solutions. It is especially useful for removing practically completely such impurities or for decreasing their concentrations to very low levels.

We claim:

1. The method of removing anion impurities from acidic impure aqueous hydrogen peroxide having a pH not more than 2 pH units above the pH representing its equivalence point and an $H_2O_2$ content of at least 15% by weight, said method comprising intimately contacting said impure aqueous hydrogen peroxide at a temperature not exceeding 40° C. under fluid flow conditions with an anion-exchange resin having functional quaternary ammonium groups whose basic nitrogen atoms are attached through saturated aliphatic hydrocarbon groups to the aromatic nuclei of a cross-linked copolymer of styrene and divinyl benzene, said resin being in the form of a salt selected from the group consisting of the carbonate and the bicarbonate salts of said resin, and said impure aqueous hydrogen peroxide containing as impurities anions other than the anion of said selected salt, then separating the resin and the aqueous hydrogen peroxide.

2. The method of removing anion impurities from acidic impure aqueous hydrogen peroxide having a pH not more than 2 pH units above the pH representing its equivalence point and an $H_2O_2$ content of at least 15% by weight, said method comprising intimately contacting said impure aqueous hydrogen peroxide at a temperature of 10 to 30° C. under fluid flow conditions with an anion-exchange resin having functional quaternary ammonium groups whose basic nitrogen atoms are attached through saturated aliphatic hydrocarbon groups to the aromatic nuclei of a cross-linked copolymer of styrene and divinyl benzene, said resin being in the form of its carbonate salt, and said impure aqueous hydrogen peroxide containing as impurities anions other than the carbonate anion, then separating the resin and the aqueous hydrogen peroxide.

3. The method of removing anion impurities from acidic impure aqueous hydrogen peroxide having a pH not more than 2 pH units above the pH representing its equivalence point and an $H_2O_2$ content of at least 15% by weight, said method comprising intimately contacting said impure aqueous hydrogen peroxide at a temperature of 10 to 30° C. under fluid flow conditions with an anion-exchange resin having functional quaternary ammonium groups whose basic nitrogen atoms are attached through saturated aliphatic hydrocarbon groups to the aromatic nuclei of a cross-linked copolymer of styrene and divinyl benzene, said resin being in the form of its bicarbonate salt, and said impure aqueous hydrogen peroxide containing as impurities anions other than the bicarbonate anion, then separating the resin and the aqueous hydrogen peroxide.

4. The method of removing anion impurities from acidic impure aqueous hydrogen peroxide having a pH not more than 2 pH units above the pH representing its equivalence point and an $H_2O_2$ content of at least 15% but not more than 60% by weight, said impure aqueous hydrogen peroxide containing as impurities anions other than the bicarbonate anion, said method comprising passing said impure aqueous hydrogen peroxide at a temperature of from 10 to 30° C. through a column of an anion-exchange resin having functional quaternary ammonium groups whose basic nitrogen atoms are attached through saturated aliphatic hydrocarbon groups to the aromatic nuclei of a cross-linked copolymer of styrene and divinyl benzene, said resin being in the form of bicarbonate salt.

5. The method of removing anion impurities from acidic impure aqueous hydrogen peroxide having a pH not more than 2 pH units above the pH representing its equivalence point and an $H_2O_2$ content of from 60% to about 95% by weight, said impure aqueous hydrogen peroxide containing as impurities anions other than the carbonate anion, said method comprising slurring with said impure aqueous hydrogen peroxide, at a temperature of from 10 to 30° C. and under agitation, an anion-exchange resin having functional quaternary ammonium groups whose basic nitrogen atoms are attached through saturated aliphatic hydrocarbon groups to the aromatic nuclei of a cross-linked copolymer of styrene and divinyl benzene, said resin being in the form of its carbonate salt, then separating the resin and the aqueous hydrogen peroxide.

References Cited by the Examiner

UNITED STATES PATENTS

| | | | |
|---|---|---|---|
| 2,485,485 | 10/1949 | Dudley | 210—37 |
| 2,591,573 | 4/1952 | McBurney | 260—2.1 |
| 2,676,923 | 4/1954 | Young | 23—207 |
| 2,772,237 | 11/1956 | Bauman et al. | 210—37 X |

FOREIGN PATENTS

| | | |
|---|---|---|
| 167,414 | 1/1951 | Australia. |
| 1,006,402 | 4/1957 | Germany. |

OTHER REFERENCES

Industrial and Eng. Chem., vol. 43, No. 5 (May 1951) page 1085.

OSCAR R. VERTIZ, *Primary Examiner.*

MAURICE A. BRINDISI, MILTON WEISSMAN,
*Examiners.*

W. W. McDOWELL, M. N. MELLER, G. D. MITCHELL, O. F. CRUTCHFIELD, *Assistant Examiners.*